Patented Nov. 10, 1936

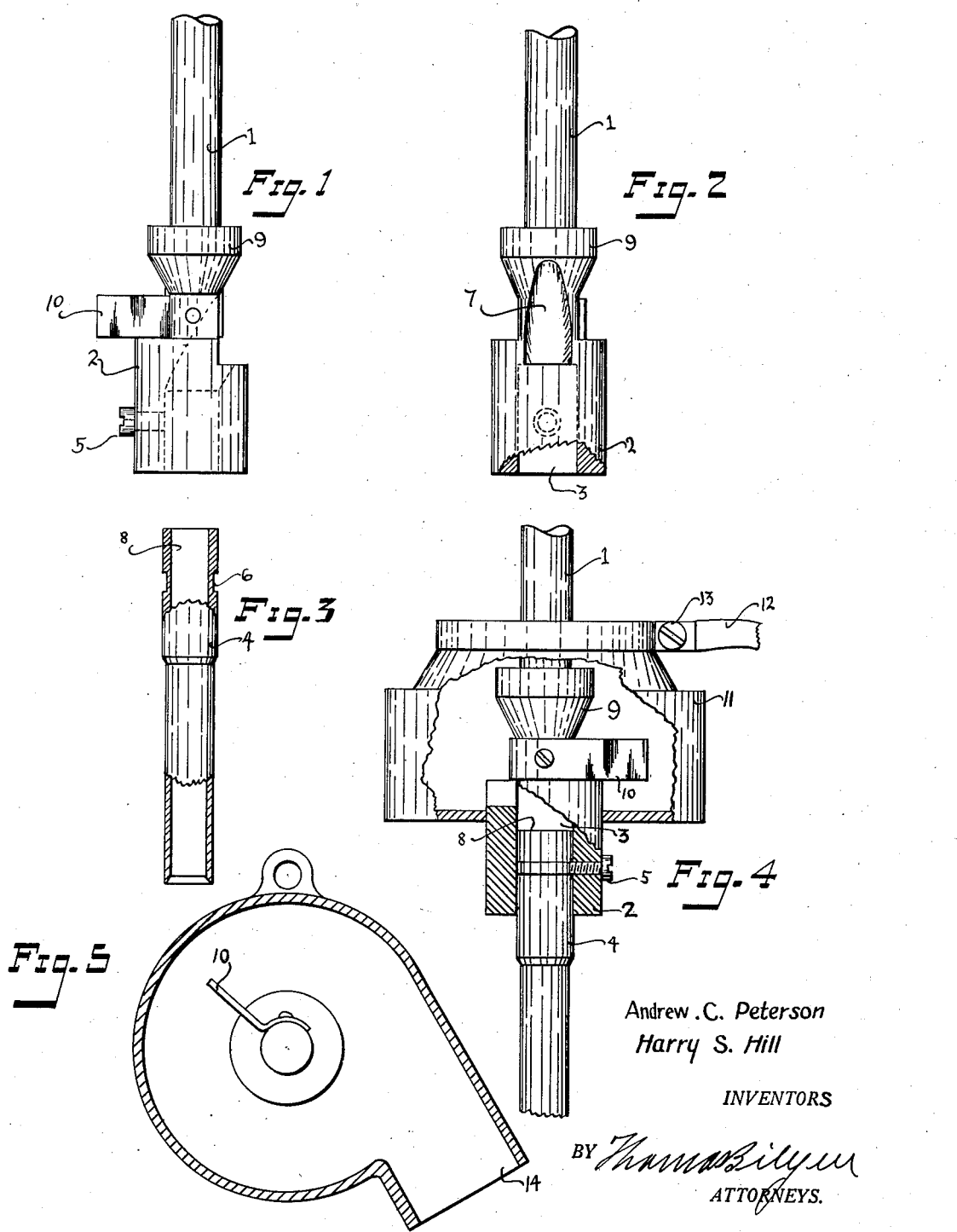

2,060,313

UNITED STATES PATENT OFFICE 2,060,313

CHUCK FOR PAPER DRILLS

Harry S. Hill and Andrew C. Peterson, Portland, Oreg., assignors to Harry S. Hill Manufacturing Co., Portland, Oreg., a corporation of Oregon Application February 25, 1935, Serial No. 8,074

1 Claim. (Cl. 164—86)

This invention relates to a boring machine for stacks of paper and it is the object of this invention to provide a simple device that will drill holes in stacks of sheets of paper or other relatively thin sheets of stacked material to be used in the paper industry.

The invention is comprised primarily of a chuck having a hole or socket disposed in its lower end into which the drill bit is inserted and fastened. The drill bit is in the form of a hollow spindle through which the cut disks upwardly feed. A hole is disposed longitudinally of the body of the chuck that is in communication with the hole in the bit and the discharge hole communicates the hole in the bit with the exterior of the chuck through one of its sides.

A collecting and discharge housing is removably secured to the chuck and an agitating blade is secured to the drilling spindle to which the chuck is attached that acts as an agitating and suction reactor for eliminating the disks delivered into the housing and from there delivered to a discharge outlet.

Means is provided for supporting the collector housing independently of the chuck assembly.

The primary purpose of our invention consists in providing a paper drill to be used as a production unit for the drilling of holes in paper in commercial quantities.

A further object of our invention consists in constructing our device so that it will be comprised of a limited number of simple parts that will have a limited first cost and that may be used in conjunction with any drilling machine and one that will have a long and useful life which will be practically free of operating and mechanical annoyances.

Other objects and advantages will be apparent and the device readily understood from the following description of the accompanying drawing.

With these and incidental objects in view, the invention consists in certain novel features of construction and combination of parts, the essential elements of which are set forth in the appended claims, and a preferred form of embodiment of which is hereinafter shown with reference to the drawing which accompanies and forms a part of this specification.

Fig. 1 is a side elevation of the chuck, the driving spindle thereon and the agitating blade.

Fig. 2 is a front elevation of the mechanism illustrated in Fig. 1.

In Fig. 1 and Fig. 2 the housing is shown removed from the assembly.

Fig. 3 is a fragmentary sectional side elevation of the drilling bit.

Fig. 4 is a side elevation, partially in section of the drilling chuck, illustrating the drilling spindle secured thereto and illustrating the drilling bit secured thereto and also illustrating the housing around the chuck and illustrating the agitating blade disposed therein.

Fig. 5 is a section plan view of the assembled mechanism illustrated in Fig. 4. This view is taken on line 5—5 at Fig. 4 looking in the direction indicated.

In the drawing:

Like reference characters refer to like parts throughout the several views.

We have here shown our device as being used and secured to the drilling spindle 1 of any suitable drilling machine as a bench drill commonly used in the metal industry. A chuck 2 is secured to the spindle 1 by any suitable fastening means. A socket 3 is disposed in the lower end of the chuck into which the drilling bit 4 is inserted. Driving relationship between the chuck and drilling bit is secured through the use of set screw 5. To precisely fit the bit relative to the chuck, a recess 6 is turned in the outer upper end of the drilling bit and in which the inner end of the set screw 5 is made to engage. A discharge outlet 7 communicates through the side wall of the chuck 2 with the hole 8 disposed in the drill stem. A hub 9 upwardly extends from the chuck to facilitate the fastening of the assembly to the drive shaft 1 of the driving machine. An agitating and fan blade 10 is secured to the chuck assembly. A housing 11 is disposed about the chuck and the same is maintained stationary by the securing of the housing to an arm 12 secured to any suitably stationary support. The housing is secured thereto by any suitable means as through the use of a set screw 13. The housing is made relatively large and as the disks of paper are exuded through the stem and through the communicating discharge outlet 7 and the same emerge into the housing the packed extruded material is broken up through the use of the rapidly rotating blade 10. This blade agitates the disks and forces the same through centrifugal action out through the discharge outlet 14. A suitable container is placed thereunder or therearound to catch the material thrown therefrom.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What we claim is:

A paper drilling unit, comprising a paper drill hollow throughout its length to permit passage of cuttings therethrough, a rotatable chuck adapted to operatively engage the drill, an airtight housing embracing said chuck and provided with an outlet, said chuck having an opening through its body, one end of the opening being in open communication with one of the hollow ends of the drill and the opposite end being in open communication with the interior of said housing, a horizontally disposed fan blade secured to said chuck adapted to agitate said cuttings and to discharge the same through the outlet of said housing by an air current generated by the rotation of said fan blade.

HARRY S. HILL.
ANDREW C. PETERSON.